April 4, 1967

H. H. CARY 3,312,141

SYSTEM FOR MEASURING OPTICAL ACTIVITY OF MATERIALS

Filed April 23, 1962

INVENTOR.
HENRY H. CARY
BY
ATTORNEY

United States Patent Office

3,312,141
Patented Apr. 4, 1967

3,312,141
SYSTEM FOR MEASURING OPTICAL
ACTIVITY OF MATERIALS
Henry H. Cary, Pasadena, Calif., assignor to Applied
Physics Corporation, Monrovia, Calif., a corporation
of California
Filed Apr. 23, 1962, Ser. No. 189,337
16 Claims. (Cl. 88—14)

This invention relates to polarimetry and, more particularly, to improvements in methods and apparatus for accurately determining the amount of rotation of a plane-polarized beam of light as the beam is transmitted through a sample. This is a continuation-in-part of my prior application, Ser. No. 772,992, filed Nov. 10, 1958, now abandoned.

Although this invention may be employed in other wavelength ranges, it is especially applicable to radiation in the visible and near-visible regions. For this reason, it is described herein with particular reference to electromagnetic radiation that is called light. It is to be understood, of course, that the term "light" is not restricted to the visible range, but includes radiation in both ultraviolet and infrared ranges.

It is well known that when a plane-polarized beam of electromagnetic radiation, such as visible light, is transmitted through an optically active material, whether it be liquid, solid, or gas, the plane of polarization is rotated. Furthermore, irrespective of whether a material is optically active or not, if it is immersed in a magnetic field having a component of the magnetic field along the line along which the light is transmitted through the material, the plane of polarization is rotated and the angle of rotation of the plane of polarization is proportional to the strength of the magnetic field component and to the length of the light path through the material. The latter effect is known as the Faraday effect. The formula for such rotation is usually given in the form $$\theta = (\alpha + VH)l \quad (1)$$

where $\theta$ = the angle of rotation of the plane of polarization caused by the magnetic field and by optical activity;
$\alpha$ = a measure of the optical activity;
$H$ = strength of the component of the magnetic field along the path of the beam;
$l$ = length of the path traversed by the beam in the material;
$V$ = Verdet constant.

The Verdet constant is a function of the wavelength and also of the nature of the material through which the radiation is transmitted. The term $\alpha$ is zero for a material that is not optically active.

In this description, the term "polarization-rotation" refers either to the rotation of the plane of polarization produced because of the optical activity of a material in the absence of a magnetic field, or to the rotation of the plane of polarization produced when the material is immersed in a magnetic field having a component along the direction of travel of electromagnetic radiation through the material. Considerable scientific use, but little commercial use, has been made of the Faraday effect in the study of the polarization-rotation characteristics of materials.

In one system which has been employed in the past, a plane-polarized beam has been transmitted through a sample and the sample has been subjected to a magnetic field to aid in the determination of the polarization-rotation characteristics of the sample. In another system, a first cell, including a test sample free of any magnetic field, has been placed at one point along a path of the beam, and a Faraday cell has been placed at another point along the beam to rotate the plane of polarization of the beam by a measured amount to aid in determining the amount of rotation to which the beam is subjected in its transmission through the sample. The term "Farady cell" is employed to refer to a device that includes a coil known as a Faraday coil that is wrapped around a Faraday core such as a solid rod or such as a chamber containing a liquid or gas. In such a cell, the core is composed of a material having a substantial Verdet constant.

In such systems, tests are generally made by employing either a monochromatic beam of radiation or at least a beam limited to only a narrow band of wavelengths. This is done because of the fact that the polarization-rotation characteristics of material vary with wavelength. In either of the two types of systems just mentioned in which use is made of the Faraday effect, a beam of radiation is transmitted through a polarizer to produce a plane-polarized beam. The plane-polarized beam is then transmitted through the Faraday cell and then through an auxiliary sample cell, if one is employed, and then through an analyzer to a photosensitive element that responds to the intensity of light impinging thereon.

In the art of polarimetry, a polarizing element that is located between a source of radiation and the sample under investigation, and that transmits along a predetermined path only radiation that is polarized in a predetermined plane, is called a polarizer. Also, in this art, a polarizing element that is located between the sample under investigation and some means that responds to the intensity of light, is called an analyzer. Commonly, a polarizer and an analyzer may be in the form of a Nicol prism or a sheet of plane-polarizing material, such as that which is sold under the name "Polaroid."

Such a polarizing element generally possesses two principal planes, one of which is here referred to as the polarizing plane. The latter term is employed here to refer to the plane in which a beam of light is plane-polarized after passage through the element along a selected path. When a polarizer and an analyzer have their polarizing planes perpendicular to each other, they are said to be crossed. In such a case, when no element producing polarization-rotation is located between the polarizer and the analyzer, the beam transmitted through them has a minimum intensity and the polarizer and analyzer are said to be in their extinction positions. Usually, some light is transmitted through crossed elements, even in the extinction position, for reasons which will be mentioned hereinafter.

This invention deals particularly with improvements in polarimeters in which a polarizer and an analyzer and an intervening sample are located on an optical axis along which a beam of light is transmitted and in which the polarizer and the analyzer are near or at their extinction position. In the best embodiment of this invention, a Faraday cell is also located on the optical axis between the polarizer and the analyzer, and the Faraday coil is supplied with an alternating current of predetermined frequency and also with a direct current.

Accordingly, with this invention, the average angle of rotation of the plane of polarization of the polarized beam being transmitted to the analyzer can be adjusted by a variable amount by varying the direct current through the Faraday coil. At the same time, the application of alternating current to the Faraday coil causes the angle of rotation of the beam to oscillate about this avarge value. With this arrangement, when the direct current through the Faraday coil is established at a value near the extinction point, the intensity of illumination transmitted through the analyzer fluctuates periodically in a regularly recurring manner. It has been found that under such conditions, the intensity of the illumination alternates at both the fundamental frequency and at the second harmonic, that is, at twice the fundamental frequency, and to a lesser degree, at other harmonic frequencies. Furthermore, it has been found that near extinction, the amplitude of the component of intensity at the fundamental frequency is proportional to the deviation of the rotation angle from the extinction value and, further, that near the extinction value, the average intensity of illumination is substantially independent of that deviation. In this invention, a photoelectric device is employed to measure the resultant fluctuations in intensity of radiation transmitted through the polarimeter. Because of the manner in which the intensity of illumination striking the photocell varies as a function of time, the current produced by the photocell includes a direct-current component and a second harmonic component which have magnitudes that do not depend upon the deviation of the rotation angle from the extinction position, but also an alternating-current component of fundamental frequency which has an amplitude that is proportional to the deviation.

In the best embodiment of this invention, the direct current supplied to the Faraday coil is adjusted to produce a null output at the fundamental frequency. To aid in locating that null accurately, electric filters are employed in the system that measure the output of the photoelectric cell to select components of fundamental frequency for measurement and to discriminate against other components and especially D.C. components and the second harmonic component. Also in accordance with this invention, an electric filter is employed in the system that supplies the A.C. current to the Faraday coil to eliminate from that current components of half the fundamental frequency. Also in accordance with this invention, precautions are taken to prevent the intensity of the source of radiation from fluctuating at the fundamental frequency.

Also in accordance with this invention, the sensitivity of the photoelectric device is adjusted automatically in response to changes in the D.C. component of current produced by it to compensate for fluctuations of average intensity in the radiation impinging on the photoelectric cell and also for variations in the sensitivity of the cell itself so as to produce an over-all system that produces an output signal at the fundamental frequency that depends substantially entirely on the deviation of the angle of rotation of the plane-polarized beam from the extinction position.

The foregoing and other features of this invention and various advantages thereof will become apparent from the following description taken in connection with the accompanying drawings in which.

Figures 1, 2:
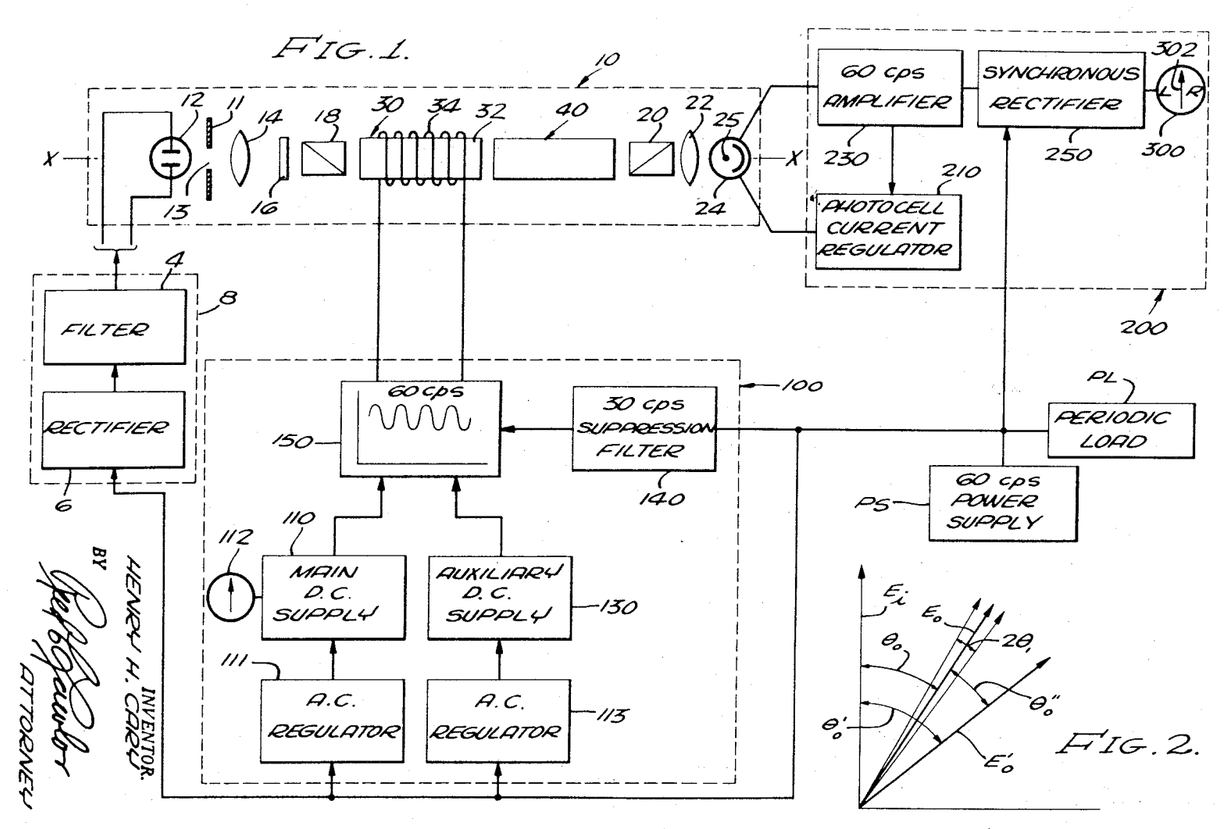
FIGURE 1 is a schematic diagram of a polarimeter embodying features of this invention.
FIG. 2 is a vector diagram employed in explaining the invention.

In the polarimeter 10 illustrated schematically in FIG. 1 and embodying features of this invention, a source of radiation 12, a diaphragm 11 having an aperture 13, a lens 14, an optical filter 16, a polarizer 18, a plane-polarization rotator in the form of a Faraday cell 30, a sample cell 40, an analyzer 20, a second lens 22, and a photodetector in the form of a photomultiplier tube 24, are arranged in the order named along the optical axis X—X of the device. This polarimeter also includes a current source 100 that is employed to vary the intensity H of the component of the magnetic field along the optical axis X—X. In addition, a light-intensity measuring system 200 is employed to measure the intensity of certain fluctuating components of the light impinging upon the photomultiplier 24.

The source of radiation 12 may be in the form of a mercury lamp or other gaseous discharge lamp that emits a line spectrum. The lens 14 is a spherical lens which has its principal focus at the aperture 13. The lens 14, therefore, collimates the radiation emerging from the source 12, causing light emerging from any point of the aperture 13 to be transmitted as a so-called "plane-parallel" beam along the optical axis X—X. In order to confine the beam to a small angle, the aperture 13 is made small.

The light filter 16 is of a type suitable for transmitting through the polarimeter only a single monochromatic component of the line spectrum of the source 12. For example, to transmit the green Hg line having a wavelength of 5461 A., the filter 16 may consist of three Corning filter plates Nos. 3486, 4308, and 5102. The polarizing elements 18 and 20 may be in the form of a Nicol prism or a sheet of polarizing material, such as Polaroid.

The light source 12, lens 14, filter 16, and polarizer 18 constitute a source of plane-polarized radiation that travels as a collimated beam along the axis X—X toward the Faraday cell and the remaining elements of the polarimeter. In any polarized beam, the magnetic vector of the radiation lies in the plane of polarization and the electric vector is perpendicular thereto.

For the purposes of initial explanation, it is assumed that the polarization plane of the polarizer 18 is horizontal and the polarization plane of the analyzer 20 is vertical, that is, that the polarizer and an analyzer are crossed. Under these conditions, the electric vector of the radiation emerging from the polarizer 18 lies in a vertical plane, that is, perpendicular to the plane of polarization of the polarizer, and the magnetic vector lies in a horizontal plane. The electric vector of the beam emerging from the polarizer is represented by the letter "$E_i$" of FIG. 2. After the beam has been transmitted through the Faraday cell and the sample cell, the electric vector $E_o$ forms an angle $\theta$ with the polarizing plane of the analyzer 20. The angle $\theta$ also represents the deviation of the plane of polarization of the radiation incident on the analyzer from the extinction position.

In considering the rotation of the beam in more detail, it is to be borne in mind that any change in the angle of rotation of the electric vector is equal to the change in position of the plane of polarization of the beam incident on the analyzer. After the horizontally plane-polarized beam emerges from the polarizer 18, it is transmitted through the core 32 of the Faraday cell 30. The core may be in the form of a solid rod composed of some material transparent to the radiation employed, or it may be in the form of a liquid-containing cell having parallel end plates. When the core consists of a solid rod, such as glass, the end plates are plane and parallel. When the core is in the form of a fluid-containing chamber, the end walls are in the form of parallel flat plates of transparent material. A suitable liquid to use to produce the desired rotation in the visible region is carbon disulphide or water.

As the plane-parallel polarized beam is transmitted through the Faraday core 32, the plane of polarization is rotated throug an angle $\theta_0'$ that depends upon the nature of the material in the core, the length of the path of travel of the light through the core, and the strength H of the component of the magnetic field in the core along the optical axis X—X. The rotation is either clockwise or counterclockwise, depending upon the direction of the magnetic field and the nature of the material.

In the Faraday cell illustrated in FIG. 1, the magnetic field H is produced by passing an electric current through a Faraday coil 34 which is wound around the core 32 concentrically with the optical axis X—X. The rotation angle is proportional to this current. In this invention, the current supplied to the Faraday coil 34 consists of both a D.C. component and an A.C. component. For the purposes of explanation, assume, for the present, that the D.C. component is large and that the A.C. component is a small A.C. component of fundamental frequency ($f$) such as 60 c.p.s., thus producing a fluctuating unidirectional current as illustrated in the graph in FIG. 1. Thus, the current in the coil may be represented by the equation $$I = I_{D.C.} + I_{A.C.} \sin \omega t \qquad (2)$$

where $$\omega = 2\pi f \qquad (3)$$

When such a current is applied to the Faraday coil 34, the plane of polarization is rotated through an average angle ($\theta_0'$) which is proportional to the D.C. component $I_{D.C.}$ and the angle of rotation varies sinusoidally through an incremental angle having an amplitude $\theta_1$ which is proportional to the amplitude of the alternating current $I_{A.C.}$. Thus, the angle of rotation produced by the Faraday cell is given by the equation $$\theta = \theta_0' + \theta_1 \sin \omega t \qquad (4)$$

Figures 4, 9:
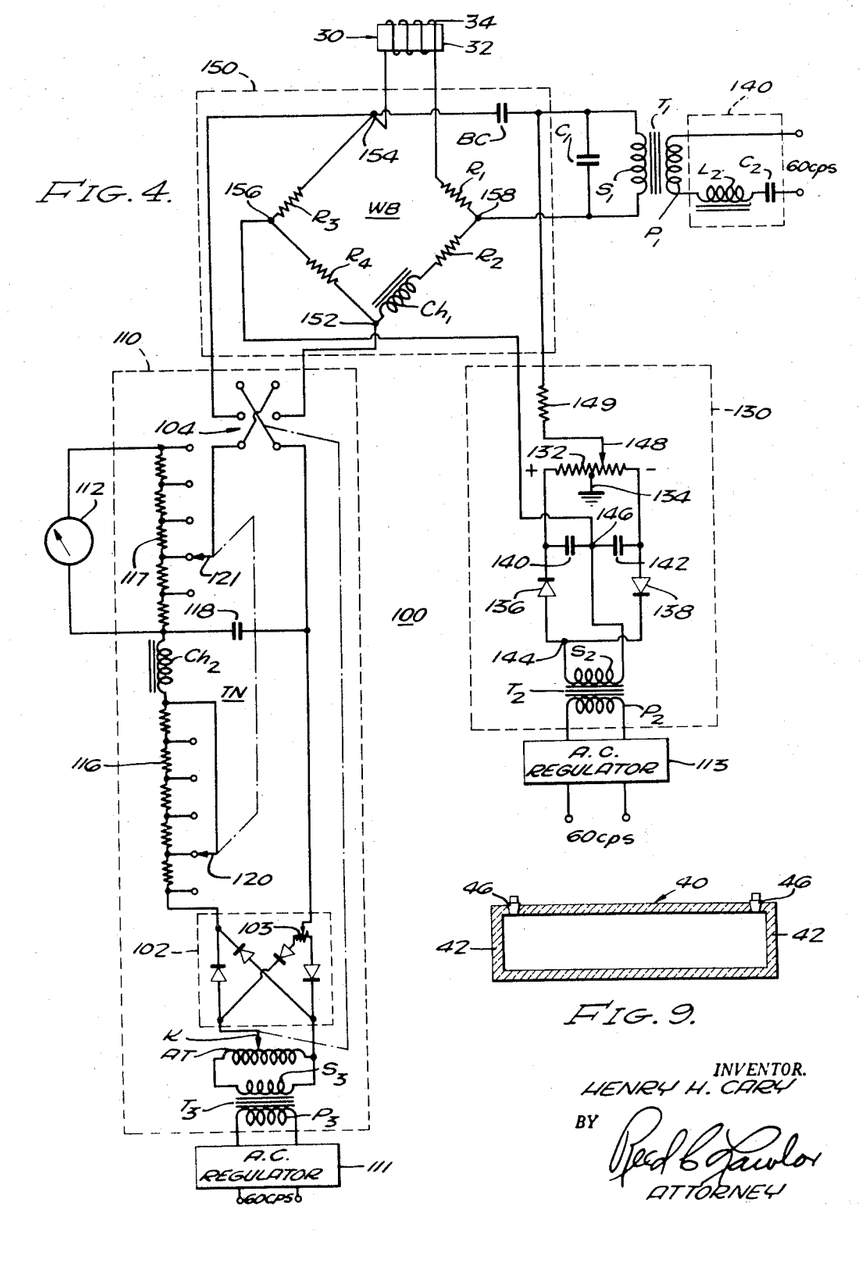
FIG. 4 is a wiring diagram of the current supply for the Faraday coil.
FIG. 9 is a cross-sectional view of a sample chamber.

The rotated plane-polarized beam emerging from the Faraday cell 30 is then transmitted through the sample cell 40 where it is further rotated if the liquid in the cell 40 is optically active. The sample cell 40 is in the form of a vessel having flat parallel end plates 42 of uniform thickness and provided with stoppers 46 as shown in FIG. 9. If the liquid contained in the sample cell is active, the plane of polarization is rotated by a further angle $\theta_0''$. Thus, the electric vector and plane of polarization of the light that emerges from the sample cell are subjected to a total rotation given by the following formula:

$$\theta = \theta_0 + \theta_1 \sin \omega t \qquad (5)$$

where $$\theta_0 = \theta_0' + \theta_0'' \qquad (6)$$

Thus, as illustrated in FIG. 2, the average position of the electric vector of light emerging from the sample cell 40 is displaced by an angle $\theta_0$ from the vertical plane. However, the actual plane of the electric vector varies over the range between the extreme values $\theta_0 - \theta_1$ and $\theta_0 + \theta_1$, varying in a sinusoidal manner with an amplitude $\theta_1$. The plane of polarization varies between $90° + \theta_0 - \theta_1$ and $90° + \theta_0 + \theta_1$.

The plane-polarized beam that has been rotated through the angle $\theta_0$ is now transmitted through the analyzer 20. The intensity of the beam transmitted through the analyzer depends upon the angle between the polarizing plane of the analyzer and the plane of polarization of the beam. If these two planes coincide, the plane-polarized beam is transmitted through the analyzer with minimum attenuation, the loss being due to reflection and to absorption of light by the analyzer. Furthermore, if the polarizing plane of the analyzer is perpendicular to the plane of polarization of the beam, maximum attenuation of the beam occurs. Generally speaking, if the polarizer and analyzer are crossed and the plane of polarization of the beam is rotated by an angle $\theta$ by the Faraday cell and the sample, the transmission coefficient T may be represented by the following formula:

$$T = T_0 + T_1 \sin^2 \theta \qquad (7)$$

where $T_0$ = transmission coefficient of the crossed system;
$T_0 + T_1$ = transmission coefficient that would be obtained if the polarizing planes of the polarizer and analyzer were parallel.

If both the polarizer 18 and the analyzer 20 are stationary, then, since the angle of rotation of the beam is varied by the Faraday cell, the intensity of radiation emerging from the analyzer 20 is thereby modulated in accordance with the formula:

$$L = L_0(T_0 + T_1 \sin^2 [\theta_0 + \theta_1 \sin \omega t]) \qquad (8)$$

which is obtained by recognizing that the intensity L is equal to the intensity $L_0$ which is present if the polarizer and analyzer are removed, multiplied by T from Equation 7. In this equation also, the value of $\theta$ given by Equation 4 is substituted.

From the foregoing equation, it can be shown that approximately $$L = L_0 \left\{ \left( T_0 + T_1 \theta_0^2 + \frac{T_1}{2} \theta_1^2 \right) + 2 T_1 \theta_0 \theta_1 \sin \omega t - \frac{T_1}{2} \theta_1^2 \cos 2\omega t \right\} \qquad (9)$$

This equation can be derived by substituting for the square of the sine of the angle the equivalent expression containing the cosine of twice the angle and rewriting using the formula for the cosine of the sum of two angles in terms of the sines and cosines of the individual angles, and then reducing the term in the square of the sine of the angle to the cosine of twice the angle and subsequently expressing as a power series all trigonometric functions except those in sin $\omega t$ and cos $2\omega t$, and then neglecting the terms in higher powers than the square of the angle and the terms in the product of the squares of two angles.

In this Equation 9, the set of terms in parentheses is the average, or D.C., component of the light flux, the next to the last term represents a fundamental-frequency component, while the last term is a second-harmonic component.

Examination of Equation 9 discloses several valuable and useful facts which are true so long as $\theta_0$ and $\theta_1$ are small, that is, less than about 10 degrees, so that the approximations used in deriving the equation are valid.

Firstly, the amplitude of the fundamental component is directly proportional to the angle $\theta_0$, and is equal to $2L_0 T_1 \theta_0 \theta_1$.

Secondly, the second-harmonic component has constant amplitude which is equal to one-fourth of the amplitude of the fundamental component for the case where $\theta_0 = \theta_1$.

Thirdly, since the lowest random noise which might be achieved in the apparatus of this invention is determined by the statistical fluctuations in the average flow of electrons produced in the photodetector 24 by the light flux, and since this flux is expressed by the terms in parentheses, Equation 9 provides a means whereby a theoretical limit of sensitivity for detection of small values of $\theta_0$ may be determined, as will be illustrated by example hereinafter. I have found that such theoretical limits of sensitivity can, in practice, be closely approached.

The first of the terms in parentheses in Equation 9 has its origin in the imperfections of the apparatus. This component arises because of the fact that the transmitted beam may not be a purely plane-polarized beam and partly because some stray light reaches the detector. The remaining part of the steady component arises from the fact that the intensity of the beam emerging from the analyzer alternates between a minimum value and a maximum value.

Initially, in order to set up the polarimeter for use, the polarizer 18 and the analyzer 20 are mounted in their crossed positions in which extinction is produced in the absence of a Faraday cell 30 and a sample cell 40. The manner in which the extinction position is detected by means of the photocell 24 and the light-intensity measuring unit 200 is explained in detail hereinafter.

Then with the Faraday cell 30 in place and the sample cell 40 also in place, the current through the Faraday cell is adjusted to such a condition that extinction is again produced. In order to produce a standard reference condition for making this test, the sample cell 40 is filled with a material which has about the same index of refraction as the material which is to be investigated, but which is not optically active. For this purpose, at least in the visible range, and in preparation for measuring the polarization-rotation properties of many liquids, water is a satisfactory optically-inactive material. In this connection, it is to be borne in mind that the Faraday-cell core itself has a substantial Verdet constant and that it may or may not be optically active. In any event, in order to establish a standard reference condition, as mentioned, a current through the Faraday coil 34 is adjusted to restore the system to the extinction condition.

In order to achieve an optimum extinction condition, the walls of both the Faraday cell 30 and the sample cell 40 through which the polarized beam travels are composed of a material which is not birefringent. For this reason, an isotropic substance, such as annealed fused silica glass, is employed in those walls and they are mounted in such a way that they are free of any substantial mechanical strain. Under such conditions, the plane of polarization of the beam that enters the analyzer 20 is parallel to the polarization plane of the polarizer 18 and is perpendicular to the plane of polarization of the analyzer 20.

After the condition of the polarimeter has been standardized in the manner described above, the water or other inert material that was used in the standardization process is removed from the sample cell 40 and the sample cell is filled wtih the liquid to be investigated.

If the test liquid is optically active, the plane of polarization of the beam is rotated from the vertical plane as it passes through the sample cell 40. The angle of rotation produced by the sample is here called $\theta_0''$. In order to restore the extinction condition, the current flowing through the Faraday coil 34 is changed by such an amount that the plane of polarization of the beam passing through the Faraday cell is rotated by the same amount, but in the opposite direction. In this way, the rotation provided by the Faraday cell neutralizes the rotation produced by the test sample. So long as the rotation $\theta_0'$ of the plane of polarization produced by the Faraday cell is not equal and opposite to that produced by the sample cell, $\theta_0'$ differs from $\theta_0''$. But, when extinction occurs, Equation 6 yields $$\theta_0' = \theta_0'' \qquad (10)$$

Under these conditions, Equation 9 becomes $$L = L_0 \left( T_0 + \frac{T_1 \theta_1^2}{2} \right) - \frac{L_0 T_1 \theta_1^2 \cos 2\omega t}{2} \qquad (11)$$

Figure 3A:
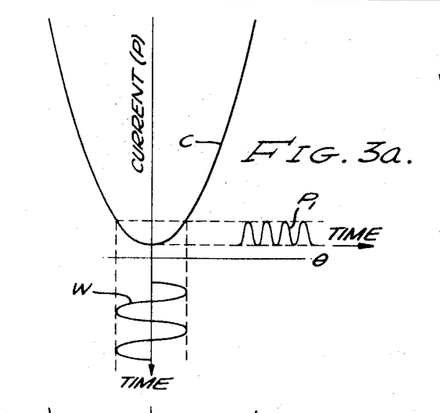
FIGS. 3a, 3b, 3c, and 3d are graphs employed in explaining the operation of the invention.
Figure 3B:
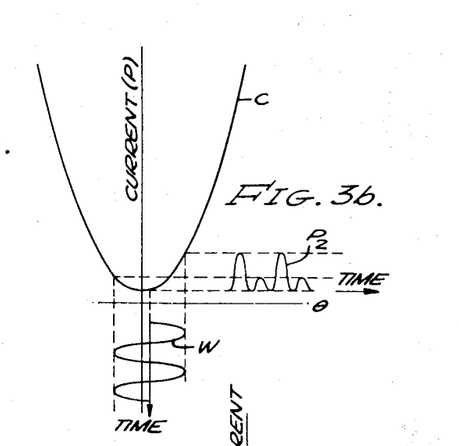
Figure 3C:
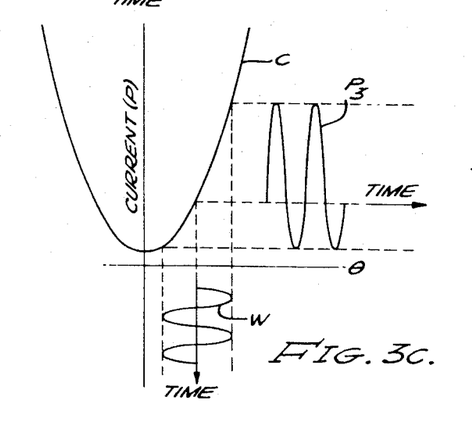

The manner in which the current generated by the photocell 24 varies for different average angles $\theta_0$ may be explaiend readily by reference to the graphs in FIGS. 3a, 3b and 3c. In the upper half of all three of these graphs, a curve C, which is approximately of parabolic shape over a small range of angle $\theta$, represents the manner in which the current output of the photomultiplier tube 24 varies as a function of the angle $\theta$. This angle $\theta$ represents the angle that the plane of polarization of the beam impinging on the analyzer deviates from the extinction position. In these graphs, it will be noted that even when the angle $\theta$ is zero, some current is produced by the photomultiplier tube 24. This current corresponds to the light transmitted through the polarizer and analyzer in the extinction condition. As the angle $\theta$ increases on either side of the extinction position, the D.C. current also increases, but approximately as the square of the deviation $\theta$. In the lower part of each of the graphs 3a, 3b and 3c, a curve W is shown that represents the manner in which the angle $\theta$ varies as a function of time. In graph 3a, it is assumed that the average deviation $\theta_0$ of the beam from the extinction position is equal to zero. In FIG. 3c, it is assumed that the average deviation $\theta_0$ is greater than the amplitude of the alternating component of the deviation. In FIG. 3b, it is assumed that the average deviation $\theta_0$ differs from zero, but is less than the amplitude of the alternating component of the deviation.

In all three cases represented in FIGS. 3a, 3b and 3c, the amplitude of the current generated by the photomultiplier tube 24 in response to the beam of light impinging thereon, is uni-directional but fluctuates with a periodic alternating component superimposed upon a D.C. component. In the case of FIG. 3a which corresponds to an extinction condition, the A.C. component of the photomultiplier current $P_1$ consists substantially entirely of a second harmonic, or 120 c.p.s., component. In the case of FIG. 3b which corresponds to a small deviation from the extinction condition, the A.C. component of the photomultiplier current $P_2$ consists of a fundamental A.C. component of 60 c.p.s. superimposed on a second harmonic A.C. component of 120 c.p.s. In the case of FIG. 3c which corresponds to a large deviation from the extinction condition, the A.C. component of the photomultiplier current $P_3$ consists primarily of a 60-c.p.s. component and odd harmonics thereof, but also a 120-c.p.s. and other even-harmonic components. For purposes of explanation, in FIGS. 3a, 3b and 3c, the magnitudes of the angles $\theta_0$ and $\theta_1$ have been greatly exaggerated. In fact, however, when this invention is employed to attain high accuracy, the range of oscillation $2\theta_1$ is very small and the average deviation $\theta_0$ is extremely small. Under these conditions, the amplitude of the component of the current of fundamental frequency is only a very small fraction of the amplitude of the second-harmonic current component.

Figure 3D:
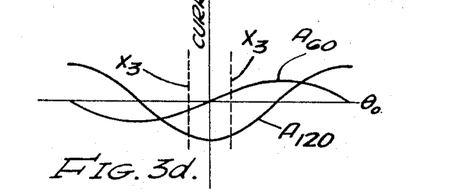

The manner in which the amplitude of the fundamental and the second-harmonic components vary with the average angle of rotation is indicated in the graph of FIG. 3d. There, it will be noted that for small value of $\theta_0$, the magnitude of the 60-c.p.s. component $A_{60}$ is proportional to the average angle of rotation $\theta_0$. In fact, the sign, or polarity, or phase, of this current is reversed as $\theta_0$ changes from positive to negative. In this graph, the curve $A_{120}$ illustrates how the magnitude of the 120-c.p.s. A.C. component of the current changes. This curve, it will be noted, is nearly flat so long as $\theta_0$ is small.

In the practice of this invention under the most important conditions, that is operating conditions lying in the area between the dashed lines X3, X3, $\theta_0$ is very small and the amplitude of oscillation of the angle of rotation is made only a degree or so. Under such conditions $$A_{60} \leqslant A_{120} \qquad (12)$$

that is, the amplitude of the 60-c.p.s. component is very small compared to the amplitude of the 120-c.p.s. component of the alternating-current part of the current generated by the photomultiplier tube 24. Also under this condition $$\theta_0 \ll \theta_1 \qquad (13)$$

In practice, in accordance with this invention, the light-intensity measuring system 200 is made selectively responsive to the 60-c.p.s. component and selectively non-responsive to the 120-c.p.s. component and the D.C. component. With such a light-intensity measuring system, the null, or extinction point, may be easily and accurately detected.

Now considering the current supply 100 in more detail, it will be noted by reference to FIG. 1 that energy from a 60-c.p.s. power supply PS is employed to energize the current supply 100. The energy from the power supply is applied both to a main direct-current supply 110 through a regulating transformer 111 and to an auxiliary direct-current supply 130 through a regulating transformer 113. In both of these supplies 110 and 130, the alternating current furnished from the power supply is converted to direct current. The direct currents provided by the two D.C. supplies 110 and 130 are applied to a special current combining circuit 150. This current, however, is applied to the combining circuit 150 through a filter 140 which suppresses any 30-c.p.s. component which may be present. By means of the combining circuit 150, the direct current supplied from the D.C. supplies 110 and 130 and the 60-c.p.s. alternating current that has been transmitted through the 30-c.p.s. suppression filter 140 are fed to the Faraday coil 34. A current meter 112 connected to the main D.C. supply is employed to measure the current required to produce extinction when a sample is in the sample cell 40.

To attain high sensitivity, it is very important to employ a 30-c.p.s. suppression filter 140 between the power supply PS and the Faraday coil. Unless such a filter is employed, any 30-c.p.s. component that may be present in the alternating current furnished by the power supply PS will be doubled in frequency by the action of the polarimeter when set near extinction, thereby generating a corresponding, but spurious, 60-c.p.s. component in the output of the photomultiplier tube 24. In the absence of such suppression filter 140, a 60-c.p.s. current component having such origin would not only interfere with, but would possibly completely mask, the 60-c.p.s. component that corresponds to the 60-c.p.s. component provided by the current supply 100. For convenience, the frequency of half the fundamental frequency is referred to hereinafter as the second subharmonic by analogy with the expression second harmonic. Thus, by way of example, if the fundamental frequency is 60 c.p.s., the second harmonic is 120 c.p.s. and the second subharmonic is 30 c.p.s.

The importance of eliminating the second subharmonic frequency can be appreciated when it is realized that the power employed in operating a polarimeter is generally derived from a power station PS which is also employed to feed other circuits that operate on electric power. It is very common for units PL operated by electrical power to include slight defects or asymmetrical characteristics which cause them to react on the power supply PS in such a way as to present a load to the power supply which varies at the second-subharmonic frequency. When such a load is present, the voltage appearing in the power supply in the neighborhood of the load and at a point remote from the power station, includes not only the fundamental frequency which is generated at the power station, but also a second-subharmonic component. This subharmonic component, in effect, appears to be generated locally. Since it is common for such subharmonics to be present in small amounts, it is therefore very important for best ultimate sensitivity, to provide a subharmonic frequency suppression filter 140 between the Faraday coil 34 and the point where such a periodic load PL is connected to the main power supply PS.

Both the main D.C. supply 110 and the auxiliary D.C. supply 130 are adjustable and the current-combining circuit 150 is of a type such that each D.C. supply 110 and 130 can supply an independently variable current to the Faraday coil 34. The manner in which the combining circuit 150 is designed to insure such independence is explained in detail hereinafter. In practice, the auxiliary D.C. supply is adjusted to supply a current to the Faraday coil 34 which will produce extinction when an inert liquid is in the sample cell 40. This adjustment neutralizes effects of errors in the positioning of the analyzer or polarizer and also neutralizes rotation due to any optical activity that the Faraday cell or its fluid might possess when unenergized and also any optical activity of the sample chamber. This adjustment is made with the main D.C. supply 110 disconnected. Thereafter, when a sample under test is present in the sample cell 40, the main D.C. supply is reconnected and is then adjusted to restore the polarimeter to an extinction condition and the current required to produce such extinction is read on the current meter 112. Details of circuits employed for this purpose are described more fully hereinafter.

For best results, the light-intensity measuring unit 200 includes a regulator 210 that adjusts the current amplification of the photomultiplier tube 24 automatically to compensate for any variations that may occur in the sensitivity of the photomultiplier tube 24 or in the intensity of the radiation emerging from the light source 12. Such a regulator, in effect, maintains the D.C. component of the current generated by the photomultiplier tube 24 substantially constant. When such a regulator is employed, the amplitude of the alternating-current component of fundamental frequency appearing in the output of the photomultiplier tube 24 does not change to any substantial degree when the sensitivity of the photodetector varies or when the intensity of the radiation emerging from the light source 12 varies. Accordingly, when employing such a current regulator 210, the magnitude of the 60-c.p.s. component of the alternating current is proportional to the amplitude of the 60-c.p.s. alternating current supplied to the Faraday coil 34 and to the deviation of the average position of the plane of polarization emerging from the sample cell 40 from the extinction position. Thus, the 60-c.p.s. component of the photocell current is given by the equation $$I_{60} = K_1 \theta_0 \theta_1 \sin \omega t \tag{14}$$

where $K_1$ is a constant that depends upon parameters of the current regulator 210 and the parts connected thereto.

In order to selectively detect the fundamental-frequency component of the photomultiplier-tube current, an amplifier 230 is employed which is selectively responsive to the component of fundamental frequency and which selectively suppresses the second harmonic component. The output of the 60-c.p.s. amplifier 230 is supplied to a phase-sensitive detector such as a synchronous rectifier 250 and the output of this rectifier is measured by means of a zero-center current meter 300 which not only indicates the magnitude of the fundamental-frequency component of the current, but also whether it is the same phase as or is oppositely phased with respect to the fundamental-frequency component of the alternating current that flows in the Faraday coil 34. The current meter 300 is connected to indicate the direction of deviation of the plane of polarization from the extinction position, that is the sign of $\theta_0'$ when the average deviation $\theta_0$ differs from zero. In other words, with the main D.C. power supply 110 disconnected, when the test sample is inserted in the sample cell 40, if the sample is dextro-rotatory, the pointer 302 moves to the right, that is, in the R direction. But, if the sample is levo-rotatory, the pointer moves to the left. The information thus obtained from the initial indication provided by the meter 300 is employed to operate a reversing switch 104 in the main D.C. supply 110 so that when current is supplied from the main D.C. supply to the Faraday coil 34, the current flows in such a direction that the rotation produced by the Faraday cell is in a direction opposite to that produced by the test sample.

Thus, in accordance with the present invention, a polarimeter is provided which is very sensitive to small angles of rotation of a plane-polarized beam and which may be accurately and reliably adjusted to rotate a polarized beam to an extinction condition. The magnitude of the threshold value of the fundamental-frequency component of the photomultiplier-tube current which can be accurately and reliably detected, depends upon the magnitude of noise current generated by the photomultiplier tube and transmitted through the amplifier 230. This depends in part on the intensity of the light flux being proportional to the square root thereof. For this reason, it is most desirable to operate near extinction. In order to make the system very sensitive, a narrow band-pass filter is employed in the amplifier. Then, making the reasonable, practical assumption that a fundamental-frequency component can be detected if it is no smaller than the amount of noise present, it can be shown that when a very narrow band-pass amplifier which has a pass band of only about 1 c.p.s. is employed, the minimum angle of rotation that can be detected is about $2 \times 10^{-5}$ degrees. This sensitivity threshold has been found applicable for a typical case of operation of a type 1P28 photomultiplier tube receiving a flux of light equal to 500 microwatts at 546 millimicrons when $T_0 = 0.0001$,
$T_1 = 0.1$, and
$\theta_1 = 1°$ approx., and the tube is operated to have the following characteristic:

$K_\lambda = 0.02$ ampere per watt where $K_\lambda$ is the cathode radiant photosensitivity at 546 millimicrons and where $T_0$ and $T_1$ are the constants that appear in Equation 7. The phototube in this case is operated with sufficient dynode voltage, or about 50 volts per dynode stage, to amplify the cathode current about 5,000 times. In calibrating the sensitivity threshold, it is assumed that the only noise source is shot noise generated by the photoelectric emission of the primary cathode in the multiplier phototube. This assumption is justified experimentally by the observation that the apparatus is in fact capable of detecting a polarization-rotation of about $2 \times 10^{-5}$ degrees.

Though the minimum detectable angle of rotation increases as the bandwidth of the amplifier 230 increases, and also increases as the intensity of the radiation is diminished, it is clear that the polarimeter of this invention is extremely sensitive to small angles of rotation of plane-polarized light.

Referring now to FIG. 4, there is shown a detailed wiring diagram of the current supply unit 100 together with the Faraday cell 30. In FIG. 4, it will be noted that the Faraday coil 34 is connected in one arm of a balanced Wheatstone bridge WB. The bridge is balanced so far as direct currents are concerned, but is unbalanced so far as alternating currents are concerned.

In the current supply unit 100, current from the main D.C. supply 110 is supplied to the bridge through one pair of diagonally opposite terminals 152 and 154, whereas current from the auxiliary current supply 130 is supplied to the bridge circuit through the other pair of diagonally opposite terminals 156 and 158. Since the bridge is balanced, no part of the current supplied by either direct-current source flows to the other direct-current source.

The Faraday coil 34 which has a resistance represented by the resistor $R_1$ is connected in the arm of the bridge between the adjacent terminals 154 and 158. A first choke $Ch_1$ which has a resistance represented by the resistor $R_2$ is connected in the arm of the bridge between the terminals 152 and 158. A resistor $R_3$ is connected in the arm of the bridge between the terminals 154 and 156. A resistor $R_4$ is connected in the arm of the bridge between the terminals 152 and 156. The electrical resistances $R_3$ and $R_4$ are very large compared with the resistances $R_1$ and $R_2$ and the resistances of the Faraday coil 34 and the $Ch_1$ of the bridge are so proportioned that the bridge is in balance so far as the direct currents are concerned. With this arrangement, it is apparent that most of the direct current supplied by the main D.C. source 110 flows through the Faraday coil 34, but only one-half of the current supplied by the auxiliary D.C. source flows through the Faraday coil. To feed alternating current through the Faraday coil 34, one end of the secondary winding $S_1$ of a transformer $T_1$ is connected directly to the terminal 158, and the other end of the secondary winding is connected through a direct-current blocking condenser BC to the terminal 154. In view of the presence of the choke $Ch_1$ in the arm between the terminals 152 and 158, substantialy all of the alternating current from the secondary winding $S_1$ flows through the Faraday coil 34. The connection of the auxiliary D.C. supply to the terminal 158 is made through the secondary winding, thus avoiding the feeding of any substantial alternating current to the auxiliary D.C. source 130. With this arrangement, therefore, the current through the Faraday coil consists of an alternating-current component superimposed upon a direct current component.

Figure 4A:
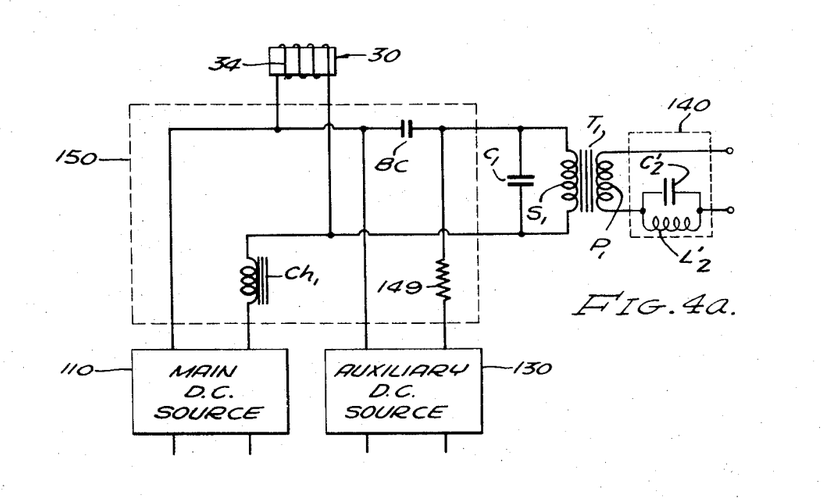
FIG. 4a is a wiring diagram of an alternative form of current supply for the Faraday coil.

The 30-c.p.s. suppression filter 140 through which power is supplied to the Faraday coil may be in the form of a series-resonant circuit or a parallel-resonant circuit. In either event, the suppression filter 140 is designed to augment, that is efficiently transmit, current at the fundamental frequency of 60 c.p.s. and to attenuate or otherwise suppress current at the second subharmonic frequency of 30 c.p.s. For example, in the arrangement shown in FIG. 4, the 30-c.p.s. suppression filter comprises a condenser $C_2$ and an inductor $L_2$ connected in series with the primary winding $P_1$ of the transformer $T_1$ in order to tune the primary circuit to the fundamental frequency of 60 c.p.s., thus simultaneously attenuating, or suppressing, the second subharmonic of 30 c.p.s. Alternatively, as shown in FIG. 4a, the 30-c.p.s. suppression filter comprises a condenser $C_2'$ and an inductor $L_2'$ connected in parallel with each other, but in series with the primary winding $P_1$ of the transformer $T_1$, in order to detune the primary circuit to the second subharmonic frequency of 30 c.p.s., thus simultaneously again attenuating or suppressing the second subharmonic of 30 c.p.s. In both cases a tuning condenser $C_1$ is connected across the secondary winding $S_1$ to tune the secondary circuit of the transformer $T_1$ to the fundamental frequency of 60 c.p.s., thus aiding in the attenuation of the second subharmonic component relative to the fundamental component.

The auxiliary direct-current source is a full-wave balanced rectifier of the voltage-doubler type which provides a voltage across a potentiometer 132 which is positive at one end and which is negative at the other end relative to a grounded terminal 134 at the mid-point of the potentiometer. The auxiliary D.C. source 130 includes a transformer $T_2$ which supplies current from the power source PS to a full-wave rectifier comprising oppositely polarized diodes 136 and 138 which are connected across capacitors 140 and 142 which smooth out ripple in the full-wave rectified voltage appearing thereacross. It is to be noted that the junction 144 between the two diodes 136 and 138 is connected to one end of the secondary winding $S_2$ of the transformer $T_2$ and that the junction 146 between the two capacitors 140 and 142 is connected to the other end of the secondary winding $S_2$. The two capacitors 140 and 142 are connected across the potentiometer 132. The junction 146 between the two capacitors 140 and 142 is connected directly to the terminal 156 of the bridge circuit, while the slider 148 of the potentiometer is connected through a resistor 149 to the junction between the blocking condenser BC and the secondary winding $S_1$.

The choke $Ch_1$ prevents any substantial alternating current from flowing into the main D.C. source 110 and from developing any substantial A.C. voltage across either of the resistors $R_3$ and $R_4$. The blocking condenser BC shorts the junction between the resistor 149 and the secondary winding $S_1$ to terminal 154. For this reason, and because no substantial A.C. voltage exists across the resistor $R_3$, no substantial amount of alternating current flows back into the auxiliary D.C. source 130. Such flow of alternating current to the D.C. supplies 110 and 130 is prevented even if the bridge is unbalanced by making $R_3=0$ and $R_4=\infty$, as shown in FIG. 4a. In this case, the value of resistance 149 is made very large to decouple the two D.C. supplies from each other.

The main D.C. source 110 comprises a variable voltage autotransformer AT connected across the secondary winding $S_3$ of a power transformer $T_3$, the primary winding $P_3$ of which is connected to the main power source PS through the A.C. voltage regulator 111. A variable voltage provided by adjusting the sliding contact K of the autotransformer AT is impressed upon a full-wave bridge rectifier 102. A potential divider 103 at one terminal of the bridge rectifier is employed to balance out any 60-c.p.s. component that might otherwise appear in the output of the rectifier. The output of this rectifier is supplied through a T network TN to a reversing switch 104 at the output of the main D.C. source. The T network TN includes two sets of tapped resistors 116 and 117 connected on opposite sides of shunting capacitor 118. A second choke $Ch_2$ is connected in series with the resistor 116 between the rectifier 102 and the capacitor 118. An accurately calibrated voltmeter 112 is connected across the resistor 117 in order to accurately measure the current flowing through the adjustable resistor 117 to the output of the main D.C. source.

The two adjustable resistors 116 and 117 are so designed that when their ganged movable arms 120 and 121, respectively, are moved in unison to make connections with corresponding taps of the two resistors, the position of the meter pointer remains nearly constant without moving the contact K of the autotransformer AT. Also, taps of the set of resistors 117 are so arranged that the full-scale reading of the voltmeter 112 corresponds to a predetermined set of values of angle of rotation, such as 1.0°, 0.3°, 0.1°, 0.03°, and 0.01°.

By adjusting the position of the sliding contact 148 of the rheostat 132, a small D.C. current supplied by the auxiliary D.C. source may be impressed upon the Faraday coil 34. This current is not only adjustable in magnitude, but it is also reversible in polarity so that a magnetic field corresponding to the amplitude of that current may be applied in either direction along the axis X—X of the Faraday cell 30.

Magnetic fields of opposite polarity may also be applied to the Faraday cell by the main D.C. source by simply moving the reversing switch 104 from one position to another. The magnitude of the part of the magnetic field contributed by the current from the main D.C. source may be varied by adjusting the variable voltage autotransformer AT. Since the angle of rotation $\theta_0'$ is directly proportional to the current flowing through the Faraday coil 34, it is not necessary with the polarimeter of this invention to bring the polarimeter to an absolute null condition at which extinction occurs, since the reading on the meter 112 indicates directly the angle of rotation introduced by the Faraday cell and since the current indicated by the meter 300 indicates how far the net average rotation $\theta_0$ differs from the extinction angle.

The meter 300 is calibrated by placing a succession of samples of known length and optical activity in the cell 40 and noting the corresponding deflection of the meter 300 when the switch 104 is open. The meter 112 is calibrated by closing the switch 104 and noting the deflections of the meter 112 corresponding to the current required to produce a zero deflection of the meter 300 for each of those samples. These calibrations are made after the instrument has been adjusted to produce a null output with a material in the sample cell that is not optically active.

Figures 5, 6, 8:
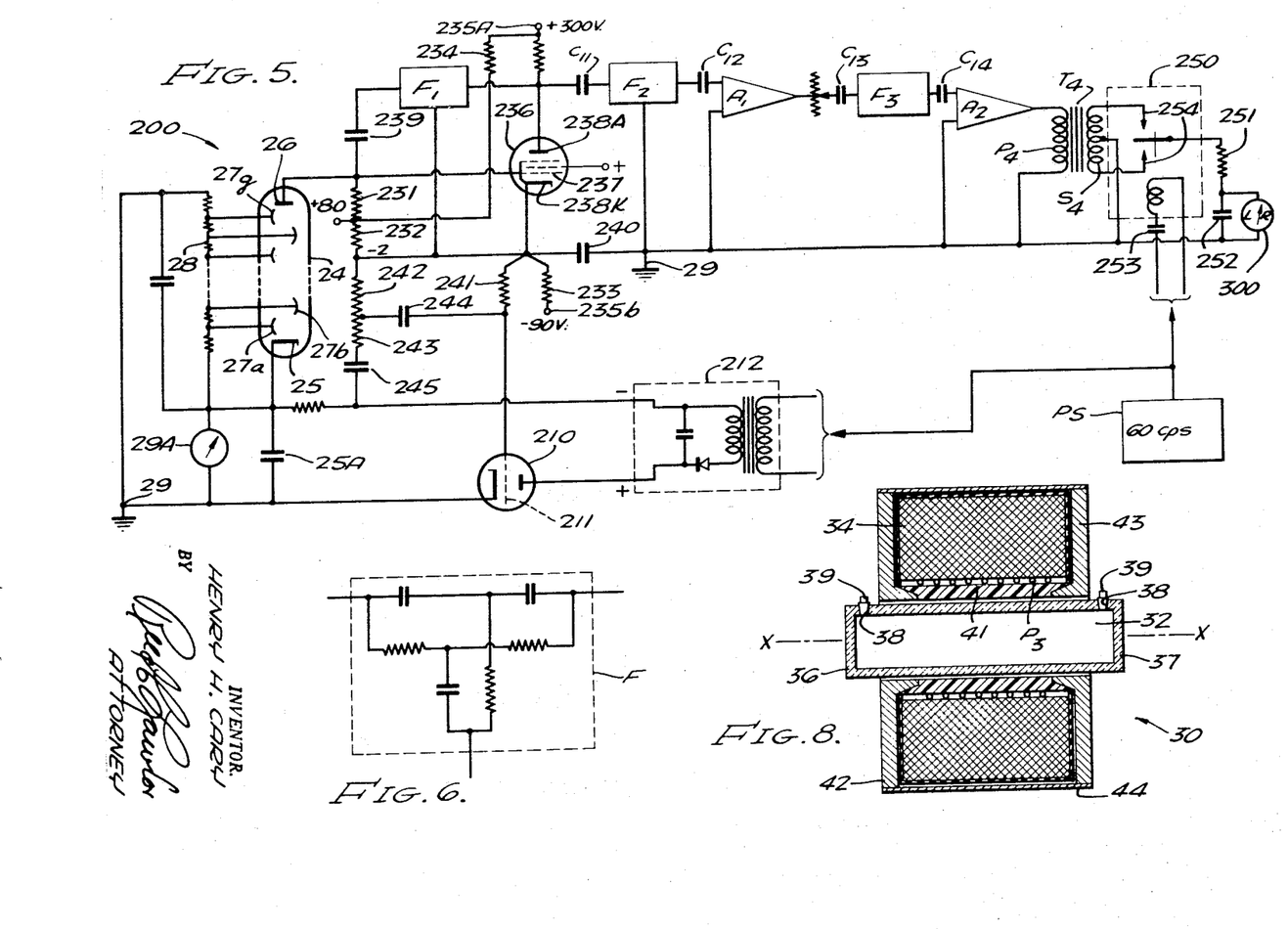
FIG. 5 is a wiring diagram of the light-intensity measuring system.
FIG. 6 is a wiring diagram of a type of filter employed in the measuring system.
FIG. 8 is a cross-sectional view of a Faraday cell employed in this invention.

In the light-intensity measuring system 200 specifically illustrated in FIG. 5, the photodetector 24 is in the form of a photomultiplier tube having a photocathode 25, an anode 26, and a series of dynodes 27a, 27b . . . and 27g arranged sequentially between the photocathode 25 and the anode 26. The photomultiplier tube 24 is energized from a suitable power supply, including the rectifier 212 and the current regulator 210. The photocathode 25 is operated at a large negative potential and the anode 26 is operated at a small negative potential. The current supplied by the rectifier 212 and the regulator 210 flows through a series of dynode supply resistors 28 to ground 29. The voltage between the photocathode 25 and ground is indicated by a direct-current voltmeter 29A. A by-pass capacitor 25A is connected across the dynode supply resistors 28 to minimize the effect of transient voltages that may appear in the output of the regulator 210. The current flowing through the anode 26 is applied to a load circuit, including a resistor 231, a resistor 232, and a resistor 234. Resistors 232 and 234 form a voltage divider between the positive, +300 volts, power supply terminal 235A and the cathode 238 of the input pentode 236. The D.C. voltage developed across this resistor network by the phototube anode current is applied to the input grid 237 of the pentode 236. The phototube anode 26 is also connected by capacitor 239 through filter $F_1$ to the anode 238A of the pentode 236. The cathode 238K of the pentode 236 is connected by a resistor 233 to a negative power supply terminal 235b having a voltage of about −90 volts. A by-pass condenser 240 is connected between the cathode 238 and ground 29. In effect, so far as direct currents are concerned, the amplifier provided by the pentode 236 and its associated circuits is a cathode follower stage. Accordingly, any D.C. voltage existing across resistors 231 and 232 is reproduced across the resistor 233. The D.C. potential appearing between the cathode 238K and ground is applied to the control grid 211 of a series regulator tube 210. By virtue of this fact, if the current gain of the photomultiplier tube 24 changes for any reason, the current flowing through the dynode resistors 28 is changed by the regulator 210 in such a direction as to tend to maintain the D.C. potential of the cathode 238K and, hence, the D.C. potential of the anode 26 constant. In operation, the voltage maintained across the resistor 231 is many times larger than the voltage change required on the grid of regulator tube 216 to carry its plate current from cutoff to its maximum value, thus assuring effective regulator action. Likewise, if the average intensity, or the steady or D.C. component of the intensity, of the light flux falling on the photocathode 25 changes for any reason, the potential of the control grid 211 of the regulator tube 216 also changes in such a way as to tend to maintain constant the potential at the cathode 238K and, hence, the potential at the anode 26 nearly constant. The regulator 210 maintains the D.C. or steady component of the current flowing through the phototube and, hence, through the resistors 231, 232, and 234 substantially constant, thereby producing in effect a constant direct-current potential at the input of the pentode 236. A stabilizing circuit, comprising resistors 241, 242, and 243 and capacitors 244 and 245, is employed to prevent oscillation of the photomultiplier tube and regulator 210.

A notch filter $F_1$, which has a zero or very nearly zero voltage transmission coefficient at the fundamental frequency of 60 c.p.s., is connected between the anode 238A and the grid 237 of the pentode 236 through a blocking condenser 239. This filter $F_1$ may be of the parallel-T type illustrated in FIG. 6. Since the motch filter $F_1$ transmits signals at all frequencies except 60 c.p.s., this filter provides negative feedback between the output circuit connected to anode 238A and the input circuit connected to control grid 237 of pentode 236. In fact, the notch filter $F_1$ and the capacitor 239 comprise the principal path for all alternating-current components of the anode current for phototube 24, except for the 60-c.p.s. component. As a result, the input amplifier that includes the pentode 236 has a high gain at 60 c.p.s. but a very low gain at all other frequencies. With this arrangement, by virtue of the negative feedback action of the amplifier, the filter $F_1$ acts to establish a high output impedance across the phototube 24 at the fundamental frequency and a low output impedance across the phototube at other frequencies, including the second harmonic frequency and the second subharmonic frequency. Thus, the filter $F_1$ establishes the principal load on the phototube. For this reason, at the fundamental frequency, that is the frequency at which amplification is to occur, it permits the use of larger amplification with the phototube than would otherwise be possible. In this connection, it is to be noted that if the load on the phototube were of the broad-band type, such as would be established if the load across the phototube were resistive, the anode 26 of the phototube would tend to become seriously overloaded by the second harmonic component. In this connection, it will be recalled by reference to FIG. 3d that the second harmonic component has a very large amplitude at extinction, whereas the fundamental component is very small or non-existant.

It is apparent from the explanation of the operation of the polarimeter given above that for any particular average angular rotation $\theta_0$ produced, the alternating component of the light intensity striking the photomultiplier tube 24 has a constant value relative to the average light intensity. For this reason, and because of the action of the regulator 210, the amplitude of the A.C. voltage appearing at the output of the pentode 236 is directly proportional to the average angular rotation $\theta_0$ occurring in the polarimeter and is substantially independent of any fluctuations in sensitivity of the photomultiplier tube 24 or in the intensity of the radiation supplied by the light source 12.

The output of the pentode 236 is supplied to a primary winding $P_4$ of an output transformer $T_4$ through a notch filter $F_2$, a first amplifier $A_1$, a second notch filter $F_3$, and a second amplifier $A_2$ in the order mentioned and the coupling capacitors $C_{11}$, $C_{12}$, $C_{13}$ and $C_{14}$. The notch filters $F_2$ and $F_3$ are also of the parallel-T type illustrated in FIG. 6, but they are designed to have substantially zero voltage transmission coefficients at the frequency of the second harmonic, namely 120 c.p.s. As a result, the filters $F_2$ and $F_3$ and amplifiers $A_1$ and $A_2$ transmit the signal of fundamental frequency, that is, the signal at 60 c.p.s., to the output transformer $T_4$ substantially free of any residual second harmonic component that might otherwise appear in the output current of the photomultiplier tube 24. The first coupling condenser $C_{11}$ prevents any D.C. component of the photodetector current from being transmitted to the amplifier $A_1$. The amplified voltage appearing across the secondary winding $S_4$ of the output transformer $T_4$ is applied to the synchronous rectifier 250, thereby supplying to the meter 300 a D.C. current that has a magnitude that is proportional to the amplitude of the fundamental-frequency, or 60-c.p.s., component of the photomultiplier-tube current. A capacitor 253 in the line that supplies energizing current to the rectifier is employed to synchronize the opening and closing of the rectifier contacts 254 with the passage of the fundamental-frequency component of the signal on the secondary winding $S_4$ of the transformer $T_4$ through zero. A resistor 251 and capacitor 252 at the output of the rectifier 250 aid in filtering out the pulsating part of the rectified signal, thus supplying a D.C. current to meter 300.

Because of the fact that the rectifier 250 is of the synchronous type and is supplied with power from the same power source PS that causes the plane of polarization to oscillate, the direction in which the current flows through the meter 300 corresponds to the direction of the average deviation of the plane of polarization of the beam relative to the polarizing plane of the analyzer 20. For this reason, the indications supplied by the zero-center meter 300 not only indicate the deviation of the plane of polarization of the output beam from the extinction position when the main power source 110 is inactive, but also the direction of that deviation from the extinction position. With this arrangement, the operator of the apparatus can determine in what position to set the reversing switch 104 of the main D.C. source in order to produce a null output as explained above and also how to adjust the variable-voltage transformer AT in order to produce a null output.

In order to minimize errors due to fluctuations in the intensity of the source of radiation 12, the source 12 is energized with rectified D.C. power. To this end, the light source 12 is supplied with D.C. power from a power supply 8 that includes a balanced rectifier 6 and a low-pass filter 4 which has a cutoff well below the fundamental frequency of 60 c.p.s. In practice, the balanced rectifier may be of the same kind as the rectifier 102 illustrated in FIG. 4, and the low-pass filter may have a cutoff of about 8 c.p.s.

In accordance with the invention described above, it is therefore possible to achieve accurate measurements of the angle of rotation provided by optically active liquids placed in a sample cell 40. Likewise, measurements may be made when the sample cell is filled with gas or when the sample cell is replaced by a solid sample.

In practice, in order to determine the presence of minute quantities of active materials in solutions, it is desirable to measure rotation angles which are as small as $0.001°$. By virtue of the fact that this invention makes it possible to measure the angle of rotation to a much smaller angle of about $2 \times 10^{-5}$ degrees even when the angle of rotation of the plane of polarization produced by an active sample is only $0.001°$, such an angle of rotation can be measured to an accuracy of about 2 percent. This invention is particularly advantageous in this respect because the neutralizing rotation is produced electrically instead of mechanically and because the threshold value of the output current of the component of fundamental frequency than can be detected, is very small. According to this invention, the threshold value is made small by operating the polarimeter near the extinction point and by eliminating the detrimental effects that would otherwise be present because of the occurrence of variations in the rotation angle at the frequency of the second subharmonic and the occurrence of variations in the output signal at the frequency of the second harmonic.

A Faraday cell of a type suitable for use in this invention is illustrated in FIG. 8. This cell includes a tubular container having two end walls 36 and 37, each of which has flat parallel surfaces. The two end walls 36 and 37 are parallel to each other. The end walls are composed of annealed fused silica glass which is free of any substantial strains and is therefore isotropic, thereby avoiding the introduction of any birefringent effects. Filler ports 38 and stoppers 39 are provided in the upper part of the vessel 32 at the ends thereof to facilitate the introduction and removal of a liquid exhibiting a suitable Verdet constant characteristic.

The Faraday coil 34 consists of a winding of insulated copper wire wound on a bobbin or spool-shaped holder having a central tubular base 41, a pair of iron end bells or flanges 42 and 43 and an outer cylindrical soft iron shroud 44. The end bells 42 and 43 and the shroud 44 provide an external magnetic case which provides a low-reluctance path which makes it possible to produce a magnetic field of substantial strength in the vessel 32 along the axis X—X without creating large magnetic fields at the sample cell 40 and at the phototube 24. In other words, the iron housing formed by the end bells 42 and 43 and the shroud 44 serves to increase the magnetic field in the Faraday cell, but at the same time, in effect, shields the sample cell and the phototube from the magnetic field produced in the Faraday cell.

In order to avoid injury to the Faraday coil, the reversing switch 104 is mechanically coupled to the moving contact K of the variable voltage transformer AT so that the reversing switch can be opened only when zero current is being supplied by the transformer to the output of the main D.C. source.

Figure 7:
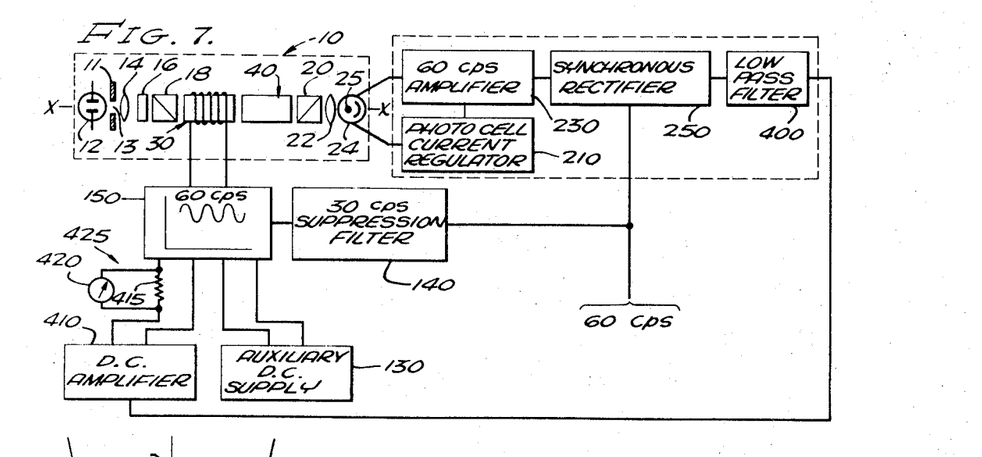
FIG. 7 is a block diagram of an alternate form of the invention.

In another form of this invention illustrated in FIG. 7, the current of the Faraday cell 30 is regulated automatically in response to the output of the synchronous rectifier 250. In the polarimeter illustrated there, the output of the synchronous rectifier 250 is first passed through a low-pass filter 400 which is designed to produce a direct current at its output, free from any substantial fluctuations at 30 c.p.s. or higher that might otherwise exist in the output of the synchronous rectifier 250. The filter 400 may be of the low-pass type, having a sharp cutoff below any frequency of interest. More particularly, since the dominant frequency of any alternating current present in the output of the synchronous rectifier 250 is of second harmonic frequency, or 120 c.p.s., the filter 400 must have a cutoff below that frequency. To avoid any disturbances that might be due to any residual amount of current of fundamental frequency, or 60 c.p.s., it is much better if the cutoff of the low-pass filter 400 is below 60 c.p.s. It is particularly important that the cutoff be below 60 c.p.s. if the polarimeter is likely to experience large deviations of the average rotation angle $\theta_0$. Furthermore, it is desirable to make the cutoff of the low-pass filter 400 below 30 c.p.s. to avoid any regenerative effects at that frequency. For best results, however, in practice, the cutoff frequency of the low-pass filter 400 is made very much lower than any of the aforementioned frequencies in order to make the loop-gain of the system less than 1 at any such frequencies. A suitable low-pass filter in a system in which the loop-gain is 100 would be a sample RC filter having a time constant of 1 second or less. When a filter having a one-second time constant is used, the entire system has a response time of about 0.01 second.

In the automatic-indicating polarimeter of FIG. 7, the current-combining circuit 150 is of the same type as that hereinbefore described. In this case, however, the main D.C. power supply is replaced by a D.C. amplifier 410 which is controlled by the output of the low-pass filter 400. The D.C. amplifier 410 is of a kind which produces no current in its output when no voltage is applied to its input, but which produces at its output a current which is proportional to and has the same sign as the voltage applied to its input.

In this case, the current from the D.C. amplifier 410 flows through a precision resistor 415 to the combining circuit being applied directly across the diagonally opposite terminals 152 and 154 of the bridge circuit of FIG. 3. The current through the resistor 415 is measured by means of a zero-center voltmeter 420 connected thereacross, the resistor 415 and voltmeter 420 thus providing a current meter 425.

When employing an automatic-indicating self-balancing polarimeter of the type illustrated in FIG. 7, all the advantages of this invention are obtained. In such a self-balancing system, the average deviation of the plane of polarization is very quickly automatically established at a value which neutralizes all but a very small fraction of the rotation produced by the sample under test in the sample cell. This self-balancing action is achieved and is made sensitive, accurate and reliable by oscillating the plane of polarization of the beam and utilizing the amplitude of an alternating-current component at the fundamental frequency to control the average rotation of the plane of polarization produced by the Faraday cell.

In order to prepare the self-balancing system for use, an optically inactive liquid, such as water, is introduced into the sample cell as hereinabove explained and the current supplied by the auxiliary D.C. supply 130 is adjusted to produce a zero reading in the voltmeter 420. In case the current required of the auxiliary D.C. supply exceeds its capacity, the analyzer or the polarizer is rotated to assist in achieving the initial null balance. After such a zeroing procedure has been completed, the water is removed from the sample cell and replaced by the liquid to be tested. In this case, the balancing current that is supplied to the Faraday coil by the D.C. amplifier 410 is measured by means of the current meter 425.

Figure 10:
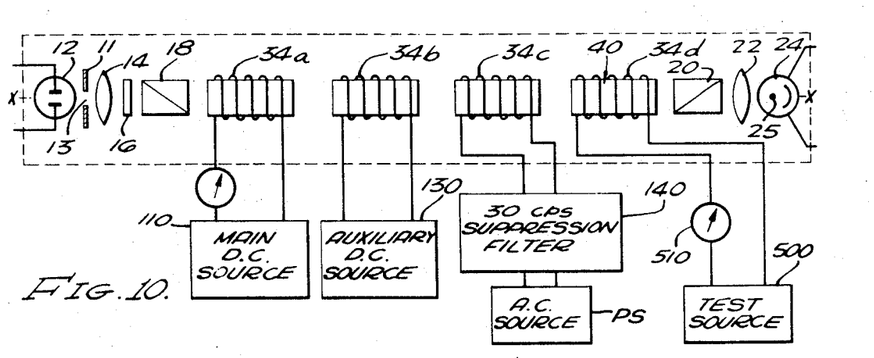
FIG. 10 represents another form of polarimeter employing some of the features of this invention.

In the application of the principles of this invention which have been specifically set forth above, the sample cell 40 has been described as one which is specifically adapted for measuring the optical activity of a liquid. It will be understood, however, that the sample cell 40 may be in the form of a Faraday cell of the type illustrated in FIG. 8 and that, in this case, by applying only direct current in the Faraday coil 34d associate with the sample cell, as illustrated in FIG. 10, measurements may be made of the optical rotation produced in the sample because of the Verdet-constant characteristics of the sample. Certain advantages may also be achieved by placing the sample cell within the Faraday coil 34 of FIG. 1.

A modified form of the invention shown in FIG. 10 employs three Faraday cells. Two of the cells have separate Faraday coils 34a and 34b for connection to the two direct-current sources 110 and 130, and another has a Faraday coil 34c for connection to the alternating-current source PS. However, the use of a common coil 34 for carrying the currents from these three sources, as illustrated in FIG. 1, is especially advantageous because of the fact that a more compact arrangement is achieved and it is necessary to employ only a single Faraday core. In that arrangement, full use of the core throughout its length is obtained for all three currents. In the modified form shown of FIG. 10, the current for a fourth Faraday coil 34d that encircles the sample cell 40 is supplied through a meter 510 from a test source 500.

In the embodiments of the invention described above, a specific form of plane-polarization rotator is employed to achieve the various advantages obtainable with this invention. Even though other types of plane-polarization rotators could be employed, so far as is now known, a Faraday cell employing a single Faraday coil is the simplest and most effective.

Figures 11, 12:
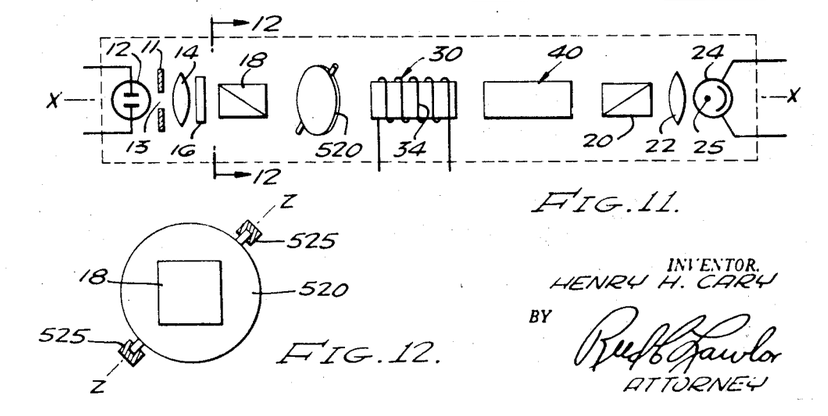
FIG. 11 represents another form of polarimeter employing some of the features of this invention.
FIG. 12 is a view of a portion of the polarimeter of FIG. 11.

Though it is especially convenient and advantageous to zero the polarimeter by means of a direct current applied to a Faraday coil from an auxiliary supply, as described above, many of the advantages of this invention may also be achieved if the initial zeroing of the polarimeter in the absence of a sample is produced in other ways. Thus, for example, the zeroing of the polarimeter may be accomplished by locating an auxiliary plane-polarization rotator, such as a tiltable plane-parallel sheet of glass 520, between the polarizer 18 and the Faraday cell 30 with its tilt axis Z—Z arranged perpendicular to the optical axis X—X and in a plane inclined at an acute angle as 45° relative to the plane of polarization of the beam emerging from the polarizer 18, as illustrated in FIGS. 11 and 12. In this case, the sheet of glass 520 may be in the form of a disc pivoted on friction bearings 525 to facilitate adjustably supporting the disc at an angle relative to the optical axis X—X. This arrangement is particularly applicable when the polarizer and analyzer are nearly crossed.

Even though the invention has been described only with particular reference to its application to the measurement of the magneto-optic properties of liquid materials, it will be understood that it may also be applied to the measurement of polarization-rotation properties of gases and solids. It will also be understood that the invention is not restricted in its application to visible light, but that it may be applied to electromagnetic radiation in wavelength regions outside the visible region. Additionally, it will be understood that the light source may be of other kinds. For example, white light may be employed with some effect, and the light may be in the form of monochromatic radiation supplied by a monochromator.

It is clear, therefore, that this invention is not to be restricted to the specific embodiments and applications described herein, but that it may be embodied in many other forms and applied in many other ways without departing from the principles of the invention and the scope of the appended claims.

The invention claimed is:

1. In a polarimeter:
polarization-sensitive means including a photosensitive device and having a polarization axis associated therewith;
a source of radiation energizable from a power source of alternating current of fundamental frequency;
means for transmitting from said radiation source along an optical path to said polarization-sensitive means a plane-polarized beam of radiation, said photosensitive means responding to radiation reaching said polarization-sensitive means to produce an electric signal having a magnitude that corresponds to the magnitude of the component of the polarized radiation that is polarized in a direction parallel to said polarization axis;
optical rotation producing means located on said path for rotating the plane of polarization of said beam;
means for locating on said path a sample having a polarization property such that the sample rotates the plane of polarization of said transmitted radiation as it is transmitted;
means acting on said optical rotation producing means to oscillate the plane of polarization of said radiation about a position crossed relative to said polarization axis at said fundamental frequency, whereby an alternating electric signal is developed by said photosensitive device at said fundamental frequency;
means selectively responsive to the fundamental component of said alternating electric signal for developing an output signal having a magnitude that corresponds to the amplitude of said fundamental component of said alternating electric signal for indicating the amount of rotation of the plane of polarization of such radiation produced by such sample; and
rectifier means supplying direct current from said power source of said radiation source, said rectifier means comprising an electric filter connected to said radiation source for attenuating alternating current components having a frequency half the fundamental frequency that is supplied from said power source.

2. In combination:
Faraday-cell means arranged on an optical path and including Faraday-coil means for establishing a magnetic field along said optical path;
means including a source of light for projecting a beam of plane-polarized light along said optical path;
a holder for supporting on said optical path a sample that rotates the plan of polarization of said beam;
polarization-sensitive means including a photosensitive element located on said path and arranged in nearly crossed relation relative to the plane of polarization of the beam of plane polarized light for producing an electric signal having an amplitude that varies in accordance with the magnitude of the plane-polarized component of the beam that lies in a predetermined directional normal to the optical axis;
an amplifier connected to said photosensitive element for amplifying A.C. components of the signal developed by said photosensitive means in response to changes in magnitude of said plane-polarized component,
said amplifier being selectively responsive to a frequency component of said signal of a predetermined fundamental frequency;
means including a source of direct current for supplying a direct current to said Faraday-coil means for rotating said plane of polarization through an average angle of rotation corresponding to the magnitude of said direct current as said beam is transmitted through said Faraday cell, in which average position the plane of polarization of the beam is about normal to said predetermined direction;
means for supplying alternating current of said predetermined fundamental frequency to said Faraday-coil means for causing the plane of polarization of the beam received by said polarization-sensitive means to oscillate about the average position determined by said direct current; and
means comprising a rectifier and a filter for converting alternating current furnished by power mains to direct current for energization of said light source, said filter attenuating fluctuating components of said fundamental frequency.

3. In combination:
Faraday-cell means arranged on an optical path and including Faraday-coil means for establishing a magnetic field along said optical path;
means for projecting a beam of plane-polarized light along said optical path;
a holder for supporting on said optical path a sample that rotates the plane of polarization of said beam;
polarization-sensitive means including a photosensitive element located on said path and arranged in nearly crossed relation relative to the plane of polarization of the beam of plane polarized light for producing an electric signal having an amplitude that varies in accordance with the magnitude of the plane-polarized component of the beam that lies in a predetermined direction normal to the optical axis;
an amplifier connected to said photosensitive element for amplifying A.C. components of the signal developed by said photosensitive means in response to changes in magnitude of said plane-polarized component;
said amplifier being selectively responsive to a frequency component of said signal of a predetermined fundamental frequency;
means controlled by said amplifier for indicating the magnitude of said A.C. component;
means including a source of direct current for supplying a direct current to said Faraday-coil means and an auxiliary plane polarization rotator for rotating said plane of polarization through angles of rotation corresponding to the magnitude of the direct current supplied by said source and the setting of said rotater, said auxiliary plane polarization rotator comprising a second source of direct current for applying a direct current to said Faraday-coil means whereby the plane of polarization may be rotated to an average position in which the plane of polarization is about normal to said predetermined direction;
means for supplying alternating current of said predetermined fundamental frequency to said Faraday-coil means for causing said plane of polarization of the beam received by said polarization-sensitive means to oscillate about the average position determined by said direct current;
utilization means controlled in accordance with the magnitude of the direct current supplied by one of said direct-current sources.

4. In a polarimeter:
polarization-sensitive means including a photosensitive device and having a polarization axis associated therewith;
means for transmitting along an optical path to said polarization-sensitive means a plane-polarized beam of radiation, said photosensitive means responding to transmitted radiation to produce an electric signal having a magnitude that corresponds to the magnitude of the component of the polarized radiation that is polarized in a direction parallel to said polarization axis;
optical rotation producing means located on said path for rotating the plane of polarization of said beam;
means for locating on said path a sample having a polarization property such that the plane of polarization of radiation that is transmitted through said sample to said polarization-sensitive means is rotated;

a source of alternating current acting on said optical rotation producing means to oscillate the plane of polarization of said radiation about a position crossed relative to said polarization axis and at a predetermined frequency, whereby an alternating electric signal is developed by said photosensitive device, said alternating electric signal having a fundamental component of a frequency equal to said predetermined frequency;

means for connecting said source of alternating current to the mains of a power source having other loads connected thereto, whereby the said source of alternating current may comprise a component that is the second subharmonic of the fundamental frequency as well as a component of fundamental frequency;

a filter that suppresses second subharmonic components connected at the input of said source of alternating current; and means controlled by said photosensitive device and selectively responsive to the fundamental component of said alternating electric signal for developing an output signal having a magnitude that corresponds to the amplitude of said fundamental component of said alternating electric signal.

5. In combination:

means for projecting a beam of plane-polarized light along a predetermined optical path;

polarization-sensitive means including a photosensitive device located on said path and arranged in nearly crossed relation relative to the plane of polarization of the beam of plane polarized light for producing an electric signal having an amplitude that varies in accordance with the magnitude of the plane-polarized component of the beam that lies in a predetermined direction normal to the optical axis;

optical rotation producing means located on said path for rotating the plane of polarization of said beam;

means for supporting a sample having polarization rotation properties on said path;

means controlled by said polarization-sensitive means and selectively responsive to a component of variation of magnitude of said plane-polarized component of a predetermined fundamental frequency;

means including a source of alternating current of said predetermined fundamental frequency acting on said optical rotation producing means for causing said plane of polarization of the beam received by said polarization-sensitive means to oscillate about an average position;

means including a first source of direct current acting on said optical rotation means for rotating said plane of polarization to an average position in which the amplitude of said fundamental frequency component, when no sample is in place, is zero;

means including a second source of direct current acting on said optical rotation means for rotating said plane of polarization to said same average position when a sample is in place; and means for indicating the magnitude of the direct current from said second direct-current source required to restore said plane of polarization to said average position.

6. In combination:

Faraday-cell means arranged on an optical path and including Faraday-coil means for establishing a magnetic field along said optical path;

means for projecting a beam of plane-polarized light along said optical path;

a holder for supporting on said optical path a sample that rotates the plane of polarization;

polarization-sensitive means including a photosensitive element located on said path plane-polarized for producing an electric signal having an amplitude that varies in accordance with the magnitude of the plane-polarized component of the beam that lies in a predetermined direction normal to the optical axis;

an amplifier connected to said photosensitive element for amplifying A.C. components of the signal developed by said photosensitive means in response to changes in magnitude of said plane-polarized component;

said amplifier being selectively responsive to a frequency component of said signal of a predetermined fundamental frequency;

an adjustable source of direct current for supplying a direct current to said Faraday-coil means for rotating said plane of polarization through a predetermined average angle of rotation corresponding to the magnitude of said direct current as said beam is transmitted through said Faraday cell;

a source of alternating current for supplying alternating current of said predetermined fundamental frequency to said Faraday-coil means for causing the plane of polarization of the beam received by said polarization-sensitive means to oscillate about the average position determined by said direct current; and means including a condenser and a choke interconnecting said direct-current source, said alternating-current source, and said Faraday-coil means, for applying direct current and alternating current to said Faraday-coil means and for simultaneously decoupling said direct-current source and said alternating-current source from each other.

7 In a polarimeter:

polarization-sensitive means including a photosenstive device having an output terminal, said polarization sensitive means having a polarization axis associated therewith;

means for transmitting along an optical path to said polarization-sensitive means a plane-polarized beam of radiation that includes monochromatic radiation of predetermined wavelength, said photosensitive device responding to said radiation of predetermined wavelength reaching said polarization-sensitive means to produce at said output terminal an electric signal having a magnitude that corresponds to the magnitude of the component of the polarized radiation that is polarized in a direction parallel to said polarization axis;

optical rotation producing means located on said path for rotating the plane of polarization of said beam;

means for locating on said path a sample having a polarization property such that said sample rotates the plane of polarization of radiation of said predetermined wavelength that is transmitted along said path to said polarization-sensitive means;

means acting on said optical rotation producing means to oscillate about a position crossed relative to said polarization axis and at a predetermined frequency, the plane of polarization of said radiation of said predetermined wavelength, whereby an alternating electric signal is developed at the output terminal of said photosensitive device, said alternating electric signal having a fundamental component of a frequency equal to said predetermined frequency;

an amplifier having an input and an output, said amplifier comprising an input stage having a control element;

means including a filter connected to said output terminal and said control element for selectively applying to said control element the fundamental frequency component of said alternating electric signal while selectively attenuating the second harmonic thereof, for developing an output signal at the output of said amplifier that has a magnitude that corresponds primarily to the amplitude of said fundamental component of said alternating electric signal; and means connected to the output of said amplifier and responsive to the magnitude of the component of said electric signal of said predetermined frequency for indicating the amount of rotation of the plane of polarization of such radiation of said predetermined wavelength produced by such sample.

8. A polarimeter as defined in claim 7 in which said photosensitive device is a photomultiplier tube.

9. In a polarimeter as defined in claim 7, control means connected to the output of said amplifier and acting on said optical rotation producing means for rotating the plane of polarization of said beam in a direction to oppose any change produced in said fundamental frequency component in response to a change in rotation of said polarized beam produced by a sample.

10. A polarimeter as defined in claim 7, wherein control means is connected to the output of said amplifier, said control means comprising means for adjusting the angle between the plane of such radiation of predetermined wavelength transmitted to said polarization-sensitive means relative to the polarization axis of said polarization-sensitive means, a synchronous rectifier operated in synchronism with the oscillation of the magnitude of said angle for rectifying the alternating electric signal developed by said photosensitive device, and means controlled by the rectified signal for operating said adjusting means to oppose any change produced in said fundamental frequency component of said current in response to a change in rotation of said polarized beam produced by a sample.

11. In a polarimeter:

polarization-sensitive means including a photosensitive device and having a polarization axis associated therewith;

means for transmitting a plane-polarized beam of radiation along an optical path to said polarization-sensitive means to cause said photosensitive device to produce an electric signal having a magnitude that corresponds to the magnitude of the component of the polarized radiation that is polarized in a direction parallel to said polarization axis;

a Faraday cell located on said path for rotating the plane of polarization of said beam, said Faraday cell comprising a Faraday core and also a Faraday coil encircling said core;

means for locating on said path a sample that rotates the plane of polarization of such radiation being transmitted therethrough;

modulating means including a source of alternating current for supplying an alternating current to said Faraday coil at a fundamental frequency to cause the plane of polarization of said radiation to oscillate about a position crossed relative to said polarization axis at said fundamental frequency whereby an alternating electric signal is developed by said photosensitive device at said frequency;

a source of direct current for supplying a direct current to said Faraday coil for rotating said plane of polarization through an average angle of rotation corresponding to the magnitude of said direct current as said beam is transmitted through said Faraday core;

common electrical circuit means for connecting both said direct current source and said alternating current source to said Faraday coil to apply both a direct current and an alternating current to said Faraday coil, said electrical circuit means including means for simultaneously decoupling said direct current source and said alternating current source from each other;

means for adjusting the direct current supplied by said direct current source to said Faraday coil to adjust said average angle of rotation;

utilization means connected to said photosensitive device for detecting change in current therein at said frequency.

12. In a polarimeter:

a source of plane-polarized light;

means for projecting said polarized light along an optical path;

Faraday-cell means having Faraday-core means located on said path for rotating the plane of polarization of said light, said Faraday-cell means having Faraday-coil means for producing a magnetic field in said Faraday-core means along said optical path;

a source of direct current connected to said Faraday-coil means;

a source of alternating current of fundamental frequency connected to said Faraday-coil means;

an analyzer mounted to receive the rotated beam of light, said analyzer being mounted with its plane of polarization crossed relative to the average position of the plane of polarization of said plane-polarized light at said analyzer;

a photodetector arranged to receive light transmitted by said analyzer for generating an electrical current that varies in magnitude in accordance with the variations of intensity of the transmitted plane-polarized light;

means connected to said photodetector for selectively measuring the amplitude of the component of said photodetector current at said fundamental frequency; and means for adjusting the direct current supplied to said Faraday-coil means by said direct-current source to minimize the amplitude of said fundamental-frequency component of said photodetector current.

13. A polarimeter as defined in claim 12, in which said selectively-measuring means is an alternating-current amplifier means that includes filtering means for selectively transmitting fundamental-frequency components of electric signals from its input to its output and which selectively discriminates against the transmission of second harmonic components of signals from its input to its output, said selectively-measuring means also comprising means connected to the output of said filtering means for indicating the amplitude of the electric current of said fundamental frequency.

14. In a polarimeter as defined in claim 12 comprising means including filtering means connected to said photodetector for developing an output signal having an amplitude corresponding to the amplitude of said fundamental frequency component; and means controlled by said output signal for effecting the adjustment of said direct current supplied to said Faraday-coil means.

15. In a polarimeter:

a source of plane-polarized light;

means for projecting said plane-polarized light along an optical path;

first and second Faraday cells located on said path, said Faraday cells having first and second cores composed of magneto-optic material for rotating the plane of polarization of light transmitted therethrough, said first and second Faraday cells comprising first and second Faraday coils encircling said first and second cores respectively about an axis extending along said optical path;

a source of direct current connected to said first Faraday coil;

a source of alternating current of fundamental-frequency connected to said second Faraday coil;

an analyzer mounted to receive the rotated beam of light, said analyzer being mounted with its plane of polarization crossed relative to the average position of the plane of polarization of said plane-polarized light at said analyzer;

a photodetector arranged to receive light transmitted by said analyzer for generating an electrical current that varies in magnitude in accordance with the variations of intensity of the transmitted plane-polarized light;

means connected to said photodetector for selectively measuring the amplitude of the component of said photodetector current at said fundamental frequency; and means for adjusting the direct current supplied to said first Faraday coil from said direct current source to minimize the amplitude of said fundamental-frequency component of said photodetector current.

16. In a polarimeter:

a source of plane-polarized light;

means for projecting said plane-polarized light along an optical path;

first and second Faraday cells located on said path, said Faraday cells having first and second cores composed of magneto-optic material for rotating the plane of polarization of light transmitted therethrough, said first and second Faraday cells comprising first and second Faraday coils encircling said first and second cores respectively about an axis extending along said optical path;

a source of direct current connected to said first Faraday coil;

a source of alternating current of fundamental frequency connected to the second Faraday coil;

an analyzer mounted to receive the rotated beam of light, said analyzer being mounted with its plane of polarization crossed relative to the average position of the plane of polarization of said plane-polarized light at said analyzer;

a photodetector arranged to receive light transmitted by said analyzer for generating an alternating electrical current that varies in magnitude in accordance with the variations of intensity of the transmitted plane-polarized light, said electrical current having a component of fundamental frequency that varies with the angle between the plane of polarization of said analyzer and the plane of polarization of said plane-polarized light at said analyzer;

amplifying means including a filter connected to said photodetector for selectively reproducing the fundamental frequency component of said alternating electrical current;

means for detecting a change in amplitude of said fundamental-frequency component of the electrical current generated by said photodetector;

means for adjusting the direct current supplied to said first Faraday coil by said direct current source to minimize the amplitude of said fundamental-frequency component of said photodetector current; and means for measuring the magnitude of the direct current supplied to said first Faraday coil.

References Cited by the Examiner
UNITED STATES PATENTS

| | | | |
|---|---|---|---|
| 2,933,972 | 4/1960 | Wenking | 88—14 |
| 2,974,561 | 3/1961 | Hardy et al. | 88—14 |

DAVID H. RUBIN, *Primary Examiner.*

JEWELL H. PEDERSEN, *Examiner.*

J. S. GOLDHAMMER, R. L. WIBERT,

*Assistant Examiners.*